US007715610B2

(12) United States Patent
Anouar et al.

(10) Patent No.: US 7,715,610 B2
(45) Date of Patent: May 11, 2010

(54) METHOD AND APPARATUS FOR PROCESSING SIGNALS IN TESTING CURRENCY ITEMS

(75) Inventors: Fatiha Anouar, Exton, PA (US); Gaston Baudat, Exton, PA (US)

(73) Assignee: MEI, Inc., West Chester, PA (US)

( * ) Notice: Subject to any disclaimer, the term of this patent is extended or adjusted under 35 U.S.C. 154(b) by 508 days.

(21) Appl. No.: 10/519,032

(22) PCT Filed: Jun. 24, 2003

(86) PCT No.: PCT/IB03/03456

§ 371 (c)(1),
(2), (4) Date: Aug. 9, 2005

(87) PCT Pub. No.: WO04/001685

PCT Pub. Date: Dec. 31, 2003

(65) Prior Publication Data

US 2006/0098859 A1 May 11, 2006

(30) Foreign Application Priority Data

Jun. 25, 2002 (EP) .................................. 02254425

(51) Int. Cl.

| | |
|---|---|
| ***G06K 9/00*** | (2006.01) |
| ***G06K 9/62*** | (2006.01) |
| ***G06K 9/46*** | (2006.01) |
| ***G06K 9/74*** | (2006.01) |
| ***G07F 1/06*** | (2006.01) |
| ***B07C 5/00*** | (2006.01) |

(52) U.S. Cl. ....................... 382/135; 382/136; 382/137; 382/138; 382/140; 194/214; 209/534; 356/71; 902/7

(58) Field of Classification Search ................. 382/135, 382/136, 137, 138, 140, 157, 191; 194/214; 209/534; 902/7
See application file for complete search history.

(56) References Cited

U.S. PATENT DOCUMENTS

| | | | | | |
|---|---|---|---|---|---|
| 5,444,793 | A | * | 8/1995 | Kelland | 382/138 |
| 5,479,570 | A | * | 12/1995 | Imagawa et al. | 706/20 |
| 5,757,001 | A | * | 5/1998 | Burns | 250/339.11 |
| 5,771,315 | A | * | 6/1998 | Matsuyama | 382/191 |
| 6,084,985 | A | * | 7/2000 | Dolfing et al. | 382/187 |

(Continued)

FOREIGN PATENT DOCUMENTS

| | | |
|---|---|---|
| EP | 0671040 | 9/1995 |

(Continued)

OTHER PUBLICATIONS

Dodgson, Neil. "Quadratic Interpolation for Image Resampling", Sep. 1997, IEEE Transactions on Image Processing, vol. 6, No. 9. pp. 1322-1326.*

(Continued)

*Primary Examiner*—Bhavesh M Mehta
*Assistant Examiner*—Mia M Thomas
(74) *Attorney, Agent, or Firm*—Fish & Richardson P.C.

(57) ABSTRACT

A method of testing a document comprises deriving a plurality of measurements from the document at a resolution R and processing the measurements to derive values at a different resolution.

30 Claims, 4 Drawing Sheets

U.S. PATENT DOCUMENTS

| | | | | |
|---|---|---|---|---|
| 6,128,402 | A * | 10/2000 | Jones et al. | 382/135 |
| 6,157,731 | A * | 12/2000 | Hu et al. | 382/119 |
| 6,163,618 | A * | 12/2000 | Mukai | 382/135 |
| 6,343,138 | B1 * | 1/2002 | Rhoads | 382/100 |
| 6,400,833 | B1 * | 6/2002 | Richert | 382/110 |
| 6,438,262 | B1 * | 8/2002 | Bernardini et al. | 382/135 |
| 6,459,806 | B1 * | 10/2002 | Raterman et al. | 382/135 |
| 6,483,576 | B1 * | 11/2002 | Gardner | 356/71 |
| 6,650,767 | B2 * | 11/2003 | Jones et al. | 382/135 |
| 6,661,910 | B2 * | 12/2003 | Jones et al. | 382/135 |
| 6,724,926 | B2 * | 4/2004 | Jones et al. | 382/135 |
| 6,731,785 | B1 * | 5/2004 | Mennie et al. | 382/135 |
| 6,757,419 | B1 * | 6/2004 | Ross et al. | 382/137 |
| 6,778,693 | B2 * | 8/2004 | Jones et al. | 382/135 |
| 6,819,410 | B2 * | 11/2004 | Adameck et al. | 356/71 |
| 6,891,180 | B2 * | 5/2005 | Holl et al. | 250/556 |
| 6,899,215 | B2 * | 5/2005 | Baudat et al. | 194/328 |
| 7,266,231 | B2 * | 9/2007 | Christophersen et al. | 382/137 |
| 7,555,155 | B2 * | 6/2009 | Levenson et al. | 382/133 |
| 2002/0003619 | A1 * | 1/2002 | Ahlers et al. | 356/71 |
| 2003/0035565 | A1 * | 2/2003 | Rhoads | 382/100 |
| 2003/0117796 | A1 * | 6/2003 | Voser | 362/231 |
| 2003/0161523 | A1 * | 8/2003 | Moon et al. | 382/139 |
| 2004/0228514 | A1 * | 11/2004 | Houle et al. | 382/137 |
| 2007/0278065 | A1 * | 12/2007 | Voser | 194/317 |
| 2007/0291993 | A1 * | 12/2007 | Nisper et al. | 382/108 |

FOREIGN PATENT DOCUMENTS

| | | |
|---|---|---|
| JP | 11-154254 | 8/1999 |
| JP | 2003-200647 | 7/2003 |
| JP | 2003-246134 | 9/2003 |
| WO | WO 94/12951 | 6/1994 |
| WO | WO 03/061981 A1 | 7/2003 |

OTHER PUBLICATIONS

Dodgson N. "Quadratic Interpolation for Image Resampling" IEEE Transactions on Image Processing, vol. 6, No. 9, Sep. 1997, pp. 1322-1326.*

Meijering et al., "Quantitative Comparison of Sinc-Approximating Kernels for Medical Image Interpolation," Lecture Notes in Computer Science 1679: 210-217, 1999, XP002227048.

Wolberg, "Image Resampling," IEEE Computer Society Press, Los Alamitos, CA, XP002227049, pp. 117-149 & pp. 160-161, Jan. 29, 2003.

* cited by examiner

METHOD AND APPARATUS FOR PROCESSING SIGNALS IN TESTING CURRENCY ITEMS

The invention relates to a method and apparatus for processing signals, especially signals derived from testing a document, such as banknotes or other similar value sheets, or currency items.

Known methods of testing currency items such as banknotes and coins involve sensing characteristics of the currency item and then using the signals derived from the sensing. For example, it is known to test banknotes by emitting light from light sources towards a banknote and sensing light reflected or transmitted from the banknote using light sensors. Signals derived from the light sensors are processed and used to determine, for example, what denomination the banknote is and whether or not it is genuine.

A problem with prior art systems is accessing the sensed items to a high enough resolution, bearing in mind the size, spacing and arrangement of the sensors. For example, it may be desired to take a measurement at a specific point on a banknote, but the resolution of the sensors means that only a measurement in the region of the point can be taken. This problem is exacerbated when the document is skewed relative to the sensor array.

Conversely, another problem is that the resolution may be higher than necessary for the specific application, for example, when deciding which is or are the most likely denomination or denominations a banknote belongs to, without testing the validity. This increases the complexity, time and cost of the processing because of the amount of data being handled.

Aspects of the invention are set out in the accompanying claims.

Preferably, the invention is for testing banknotes and/or other types of value sheets.

Generally, the invention provides methods of signal processing in a currency tester in order to change the resolution, of measurements of the currency item, to a higher or lower resolution. In other words, the invention provides methods of varying, increasing or decreasing, the resolution.

In this specification, the term "resolution" is intended to cover resolution in various domains such as spatial resolution (such as the sampling rate or number of measurements per unit length or time) or resolution in a spectral domain, such as the frequency domain (number of spectral components or bandwidth).

Also, the term measurements includes, for example, values output by item sensors and values derived from measured or sensed values.

According to a first preferred aspect, the resolution is increased in the spatial domain, using an interpolation method, related to Nyquist theorem, which allows reconstruction of the signal at positions where there are no measurements, which can improve recognition.

According to a second preferred aspect, the resolution in the frequency domain is decreased with limited loss of useful information, in the context of document recognition, using a filtering method and reduction of the results of a Fourier transform. This enables items, for example, documents of different sizes (eg, different lengths and/or widths) to be handled in a similar manner, especially in a denomination or classification procedure, whilst preserving denomination or classification performance.

The first and second aspects may be combined.

Embodiments of the invention will be described with reference to the accompanying drawings, of which:

Figure 1:
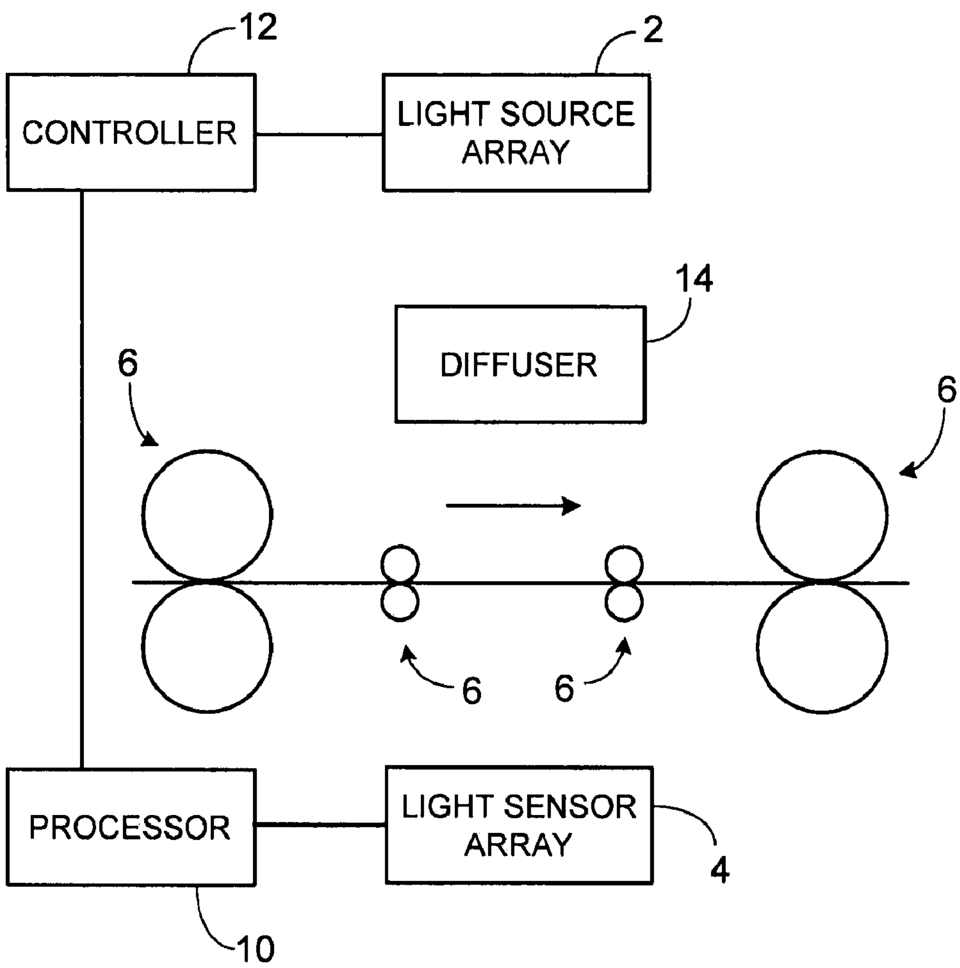
FIG. 1 is a schematic diagram of a banknote sensing system.

A banknote sensing system according to an embodiment of the invention is shown schematically in FIG. 1. The system includes a light source array 2 arranged on one side of a banknote transport path, and a light sensor array 4 arranged on the other side of the banknote transport path, opposite the light source array 2. The system includes banknote transport means in the form of four sets of rollers 6 for transporting a banknote 8 along the transport path between the light source array 2 and the light sensor array 4. The light source array 4 is connected to a processor 10 and the system is controlled by a controller 12. A diffuser 14 for diffusing and mixing light emitted from the light source array 2 is arranged between the light source array 2 and the banknote transport path.

Figure 2:
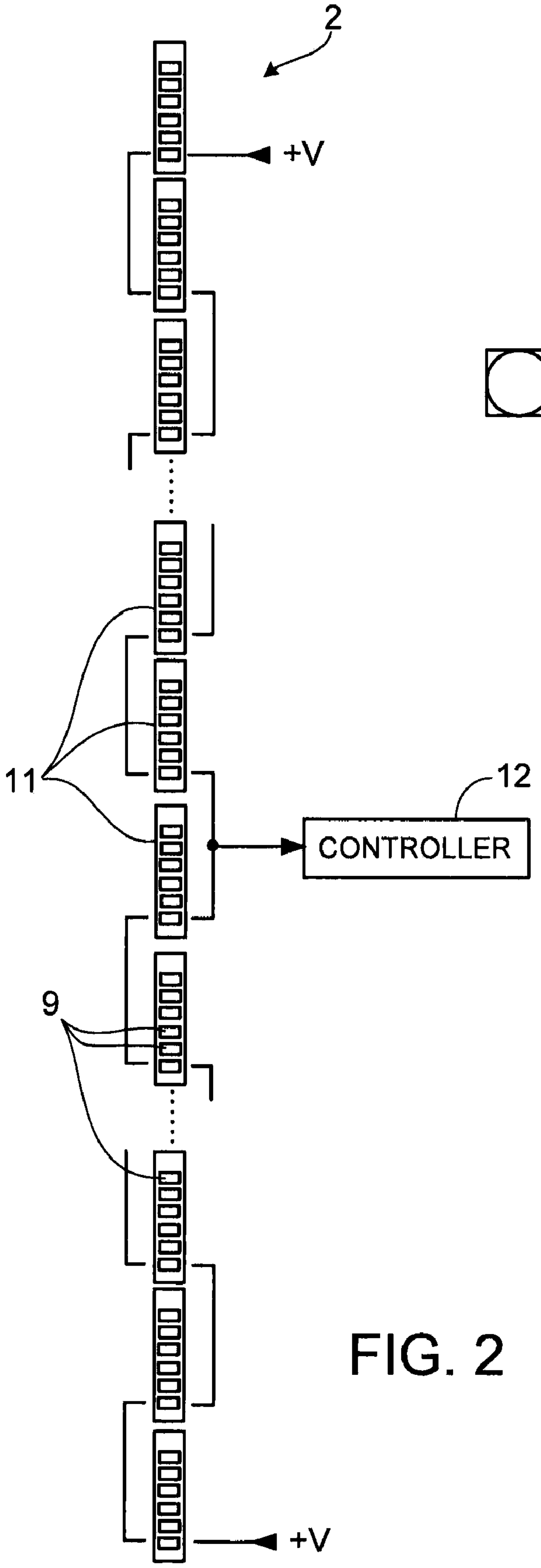
FIG. 2 is a plan view from above of the sensor array of the sensing system of FIG. 1.

FIG. 2 is a plan view from below of the light source array 2. As shown, the light source array is a linear array of a plurality of light sources 9. The array is arranged in groups 11 of six sources, and each source in a group emits light of a different wavelength, which are chosen as suitable for the application, usually varieties of blue and red. A plurality of such groups 11 are arranged linearly across the transport path, so that light sources for each wavelength are arranged across the transport path.

Figure 3:
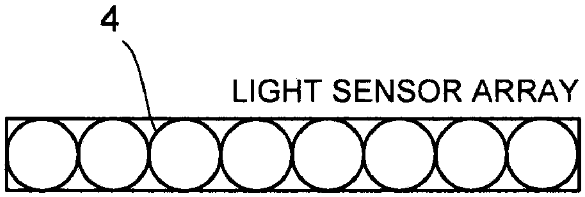
FIG. 3 is a plan view from below of the light source array of the sensing system of FIG. 1.

FIG. 3 is a plan view from above of the light sensor array 4. As shown, the light sensor array includes eight circular light sensors arranged in a line across the transport path. The sensors are 7 mm in diameter and the centres are spaced 7 mm apart in a line, so that the sensors are side by side. As a result, the whole document across its width is sensed by the sensors, to a resolution determined by the size of the sensor.

FIGS. 2 and 3 are not to scale, and the light source and light sensor arrays are approximately the same size.

In operation, a banknote is transported by the rollers 6, under control of the controller 12, along the transport path between the source and sensor arrays 2, 4. The banknote is transported by a predetermined distance then stopped. All the light sources of one wavelength are operated and, after mixing of the light in the diffuser 14 to spread it uniformly over the width of the banknote, the light impinges on the banknote. Light transmitted through the banknote is sensed by the sensor array 4, and signals are derived from the sensors for each measurement spot on the banknote corresponding to each sensor. Similarly, the light sources of all the other wavelengths are similarly operated in succession, with measurements being derived for the sensors for each wavelength, for the corresponding line.

Next, the rollers 6 are activated to move the banknote again by the predetermined distance and the sequence of illuminating the banknote and taking measurements for each wavelength for each sensor is repeated.

By repeating the above steps across the length of the banknote, line by line, measurements are derived for each of the six wavelengths for each sensor for each line of the banknote, determined by the predetermined distance by which the banknote is moved.

The measured values for the measurement spots are processed by the processor 10 as discussed below.

Figure 4:
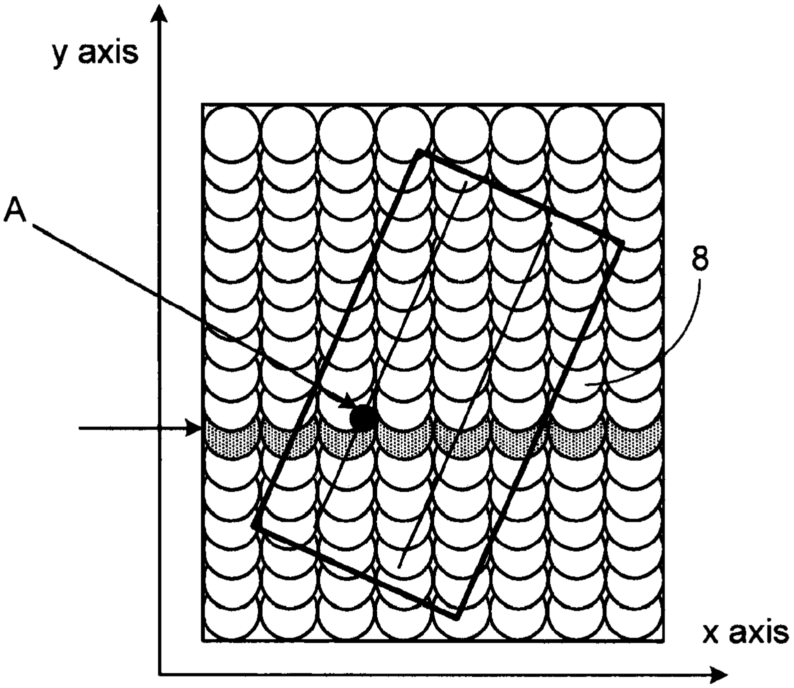
FIG. 4 is a diagram illustrating measurements of a banknote.

FIG. 4 is a diagram representing the measurement spots of a banknote for the sensor array. The x axis corresponds to across the transport path, in line with sensor array, and the y axis corresponds to the transport direction. In this example, the banknote is advanced by a distance of 1.75 mm for each set of measurements, so the lines are 1.75 m apart, and the measurement spots for adjacent lines overlap, as shown in FIG. 4. FIG. 4 also illustrates in outline a banknote which is skewed relative to the line of sensors. For each spot, there are measurements for each of the wavelengths. In the following, the discussion will be limited to one wavelength, but the same steps are carried out for each of the wavelengths.

The resolution of the measured values is determined by the spacing of the sensor elements (here 7 mm) and the shifting of the banknote between each set of measurements (here 1.75 mm).

According to the embodiment, the spatial resolution is increased by processing, as discussed below.

Suppose it is desired to know the value at point A in FIG. 3, indicated by the black spot, at co-ordinates (x,y).

In this embodiment, a one-dimensional interpolation is carried out along the width direction (x axis). In the present case, the spacing along the y axis is adequate for practical purposes. Alternatively, an interpolation may be performed in the y direction, as well as or instead of in the x direction.

Firstly, the nearest width line to point A is selected, on the basis of the nearest neighbour in the y direction. The measured values for each of the sensors in the selected line are retrieved.

Figure 5:
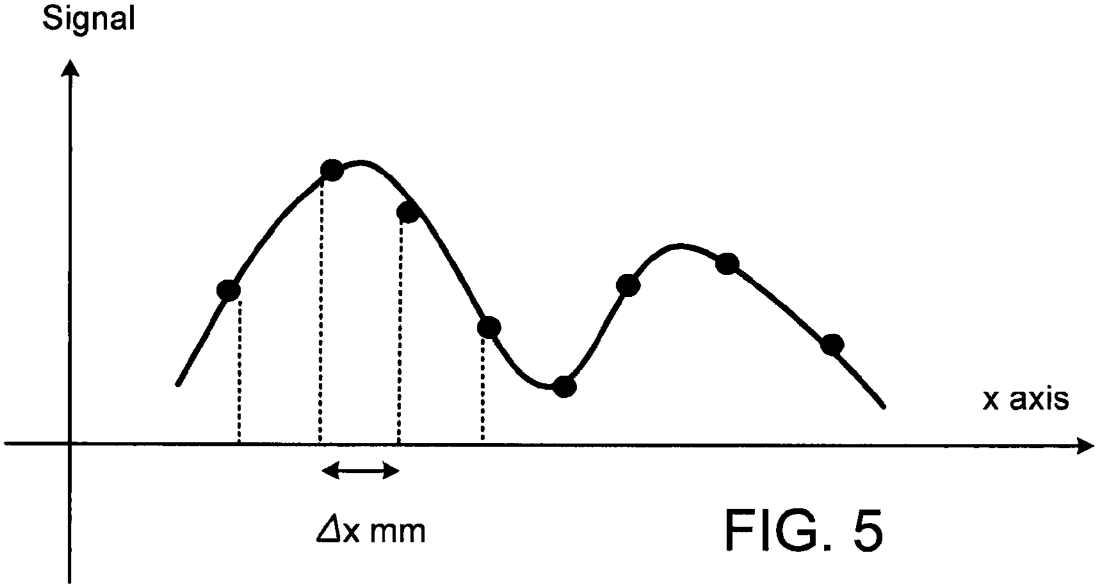
FIG. 5 is a graph of sampled values.

FIG. 5 is a graph showing examples of the measured values along the selected width line, the x axis corresponding to the x axis in FIG. 5, the y axis corresponding to the signal, or measured values, and the points corresponding to the retrieved sensor measurements, or samples.

It is preferred not to alter the measured raw data and accordingly interpolation is performed at spacings which are an integral divisor of the sensor spacings. Here, interpolation is performed for each 1.75 mm, so there are 3 interpolation points between each pair of adjacent measurement spots. As a result, the resolution over the bill in the x-y directions is 1.75×1.75 mm.

According to Nyquist's theorem, a signal can be reconstructed exactly as if it was measured assuming that the highest frequency of the signal is smaller than half of the sampling frequency (0<fmax<fs/2, fs is the sampling frequency).

Assuming that Nyquist's theorem applies, the measured values or samples are interpolated using a cubic convolution by fitting the curve of Sinc(x)=sin(x)/x. Thus, the interpolated value of the signal at the position x is given by:

$$\text{signal}(x) = \sum_{k=0}^{n-1} \text{signal}(k.\Delta x) \cdot Sinc(\pi(k.\Delta x - x)/\Delta x)$$

Where n is the number of samples and Δx is the sampling step. It should be noted that when x is equal to an exact multiple of steps, i.e. when $x=k_1\Delta x$, the interpolated value is equal to the sampled value.

$$\text{signal}(k_1\Delta x) = \sum_{k=0}^{n-1} \text{signal}(k.\Delta x) \cdot \text{Sinc}(\pi(k.\Delta x - k_1\Delta x)/\Delta x)$$

-continued $$Sinc(\pi(k.\Delta x - k_1\Delta x)/\Delta x) = Sinc(\pi(k-k_1)) = 0 \text{ except for } k = k_1$$

In other words, the interpolated function passes through the sampling points.

In order to reduce the edge effect due to the oscillation of the Sinc function (Gibbs phenomena), the raw samples are weighted by the Hamming window. The window gives more important weights to the points in the middle of the window and small weights to the points at the edge of the window. These weights are given by:

$$w(u) = 0.54 - 0.46.\cos\left(2\pi\frac{u}{n}\right),\ 0 \le u \le n-1$$

Where n is the number of samples.

Other type of windows could be used such as the Hanning window or the Kaiser-Bessel window, or other similar known types of weighting window for compensating for edge effects. The choice of the window is a tradeoff between the complexity of the window and its performance of detection of harmonic signal in the presence of noise. In the present case, the Hamming window leads to good frequency selectivity versus side lobe attenuation (Gibbs phenomena).

The window is applied to all points to obtain new samples. Afterwards, the previous cubic convolution interpolation function is applied to these new samples. The result is divided by the value of the window at the x position in order to retrieve the interpolated value at the same level as the original signal.

The mean of the measures is removed before interpolation in order to reduce the effect of the D.C. component in the frequency domain. The mean is then added back after interpolation. The interpolated value of the signal at the position x using the window is given by:

$$\text{signal}(x) = \left[\sum_{k=0}^{n-1} [\text{signal}(k.\Delta x) - m].w(k) \cdot Sinc\left(\frac{\pi(k.\Delta x - x)}{\Delta x}\right)\right] \Big/ w\left(\frac{x}{\Delta x}\right) + m$$

Where n is the number of samples, Δx is the sampling rate and m is the mean of the samples. k·Δx is the position of the samples.

As the interpolation is performed along a horizontal line and due to the skew, the number n varies according to the maximum usable spots along one line that fall entirely in the banknote area. Also the size of the window depends on n. The values of the window can be stored into a lookup table for different values of n.

For instance, if the number of measurements is 8 and the interpolation rate is Δx=4, the window is stored for 0≦h≦(8−1)*4−1.

Figure 6:
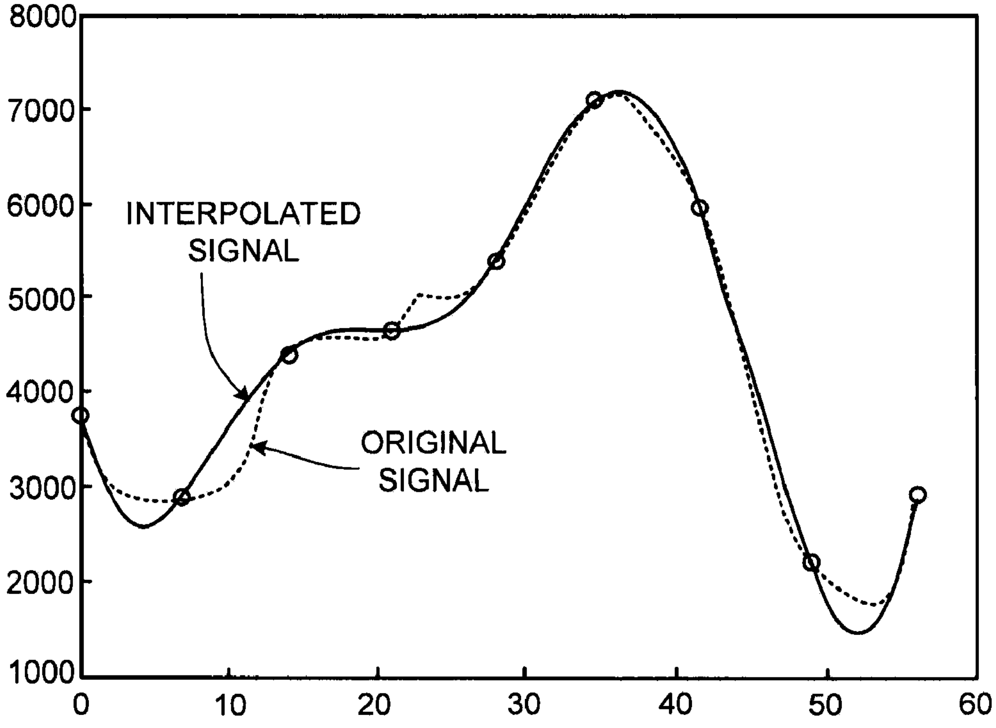
FIG. 6 is a graph comparing a measured signal with a reconstructed signal.

FIG. 6 is a graph illustrating an example using 9 sampling points (shown as points) and a reconstruction of the signal using a method as described above (the smooth curve) compared with a signal derived by scanning across the width line to determine the actual measurements between the sampling points. The x-axis represents distance across the transport path and the y-axis represents the signal value.

In this case for example, the reconstruction error defined by the mean of the relative absolute error between the reconstructed bill and the scanned bill without the Hamming window is 11%, and using the Hamming window the error drops to 6%.

The above approach can be used to derive a reconstructed value at a specific point or points for a specific wavelength or wavelengths, for example, points relating to specific security features. Similarly, the method can be used to increase the resolution over specific areas of a banknote. Alternatively, the resolution can be increased over the whole of a banknote, without needing to increase the number of sensors.

The signals derived from the banknote either directly from measurements and/or after processing to increase the resolution, are then used to classify (denominate or validate) the banknote in a known manner. For example, the signals are compared, usually after further processing, with windows, thresholds or boundaries defining valid examples of target denominations. Numerous techniques for processing signals derived from measurements of banknotes to denominate and/or validate the banknote are known, and will not be described further in this specification.

Various other interpolation methods could be used. In a simple example, the signal of the nearest neighbor point is assigned to the desired point. The result of the interpolation method discussed above as an embodiment can also be approximated by performing the interpolation into the frequency domain instead of the time domain. In fact, the convolution with a Sinc function in the time domain corresponds to applying a perfect low pass (LP) filter (cut off frequency Fc=Fs/2) to the Fourier transform and computing the inversion of DFT (discrete Fourier transform) to get the interpolated value. If the Nyquist theorem is respected, this method gives only an approximation that depends on how the inversion of the Fourier transform is approximated.

A second embodiment of the invention will now be described.

The second embodiment involves an apparatus as shown in FIGS. 1 to 3 However, the processing of the resulting signals is different from the first embodiment.

This embodiment uses signals derived from the banknote to denominate a banknote, that is, to determine which denomination (or denominations) the banknote is likely to belong to. It is known to use neural networks such as a backpropagation network or an LVQ classifier to denominate banknotes. An example of a neural network for classifying banknotes is described in EP 0671040. In general terms, an n-dimensional feature vector is derived from measurements of characteristics of a banknote, and the feature vector is input to the neural network for classification. Various characteristics and measurements can be used to form the feature vector.

Different denominations of banknotes are usually different sizes (different lengths and/or widths), but the feature vectors input to the neural network are the same dimension for each banknote. Therefore the data forming the feature vector must be independent of the size of the measured banknote but also chosen to contain sufficient information to classify the banknotes accurately.

The present embodiment derives data for input to a neural network, as follows.

Measurements are derived from the sensors 4 for each of a plurality of lines across the transport path for each of a plurality of wavelengths as in the first embodiment. The data is then processed in the processor 10.

The data are collected into lines parallel to the transport path in a given wavelength with a sampling period of 1.75 mm. Then each line is normalized, for example, by dividing by the mean value for the line for the corresponding wavelength. A FFT with 128 coefficients is computed for each normalized line and each wavelength. The points outside the usable part of the banknote are filled with zeros.

As the data are normalized by removing the mean, the first complex value of the Fourier transform is 0. The data for the real and imaginary components from the indexes 1 to 14 (assuming the D.C. index is 0) are selected, which provides 14 complex values. Thus, the resolution in the frequency domain is reduced. For example, for 2 wavelengths and 2 lines along the length, the total of variables is 112 variables. This is the vector given to the neural network for classification. Other numbers of wavelengths and lines can be used, as appropriate.

Figure 7:
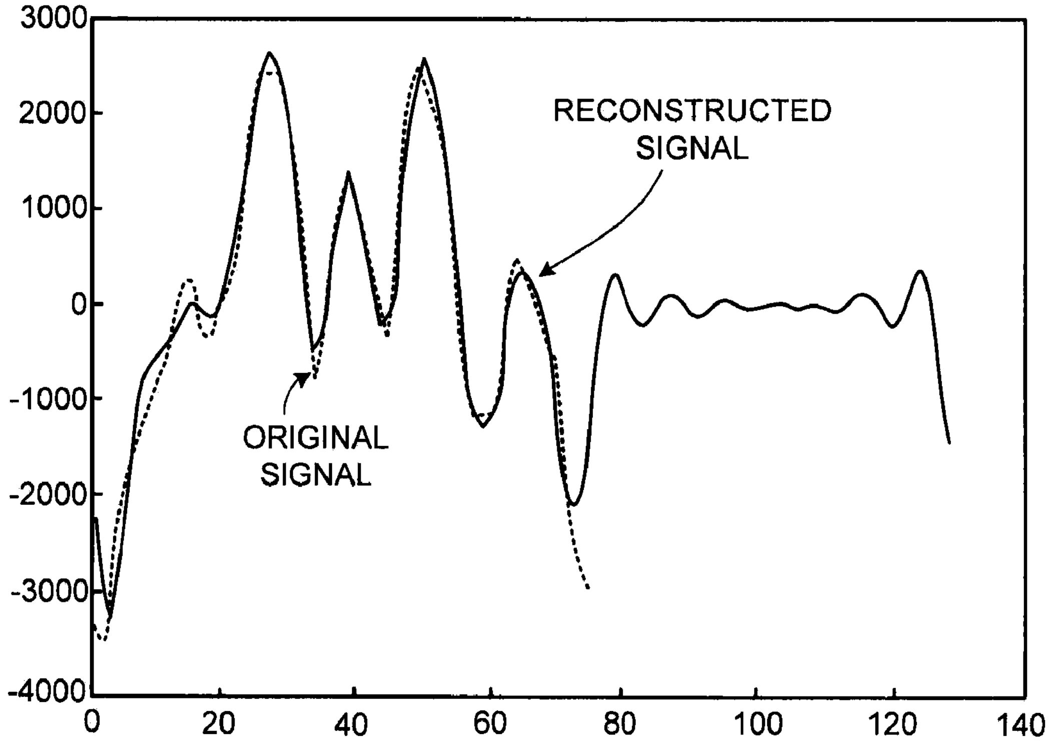
FIG. 7 is a graph comparing a measured signal with a reconstructed signal in the second embodiment.

The Fourier transform is applied to normalized lines defined along the length of the bill in one or more wavelengths. As far as the denomination is concerned, tests have shown that the frequency content can be reduced. FIG. 7 shows an example of the reconstruction of one line of a bill document after applying a perfect LP filter and using only a part of the spectrum of the Fourier transform. The solid line is the reconstructed signal and the broken line is the original signal. The x-axis represents distance along the length of the bill in the transport direction and the y-axis represents the signal value. The reconstruction is obtained using the inverse of the Fourier transform that was filtered. In practice, that means that, only a part of the Fourier transform is needed and can be used for input vectors for a classifier with almost no loss of information.

The reconstruction is very close to the original signal, and uses less data than the original signal, showing that the filtering by selecting a subset of the frequency spectrum after a Fourier transform, retains most of the useful information in the signal. This is possible if the sampling in the time space respects the Nyquist theorem, which applies along the length of the bill in this case. As a matter of fact, the sampling rate along the length is very high which is useful for feature security but can be reduced for denomination purpose.

The results of the filtering method using the FFT can also be obtained by applying a Sinc function to the signal in the time domain and perform a time decimation, but this method is more time consuming.

The first and second embodiments may be combined, so that, for example, the resolution is increased in the spatial domain and decreased in the frequency domain. The increased resolution in the spatial domain could be used, for example, for validating a currency item, while the reduced resolution in the frequency domain used for denominating the item. The transform to the frequency domain could be done on the data in the spatial domain after interpolation to increase the resolution. The invention is not limited to the type of sensing system shown and described and any suitable sensing system can be used.

References to banknotes include other similar types of value sheets such as coupons, cheques, and includes genuine and fake examples of such documents. A system may involve the use of means, such as edge-detectors, for detecting the orientation, such as skew and offset of a banknote relative to, eg, the transport direction and/or the sensor array or a fixed point(s). Alternatively, a system may include means for positioning a banknote in a desired orientation, such as with the length of the bill along the transport path with edges parallel to the transport direction, or at a desired angle relative to the transport direction and/or sensor array.

The described embodiments are banknote testers. However, the invention may also be applied to other types of currency testers, such as coin testers. For example, signals from a coin tester taking measurements of coin characteristics, such as material, at a succession of points across a coin may be interpolated to produce a signal representative of the characteristic across the coin.

The term “coin” is employed to mean any coin (whether valid or counterfeit), token, slug, washer, or other metallic object or item, and especially any metallic object or item which could be utilised by an individual in an attempt to operate a coin-operated device or system. A “valid coin” is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

The invention claimed is:

1. A method of testing a currency item in a currency testing apparatus comprising:

deriving a plurality of measurements of the currency item at a resolution (R) defined relative to the spacing of a plurality of sensing elements;

processing the plurality of measurements to derive values in at least two different resolutions wherein the resolution (R) is increased in the spatial domain using an interpolation method, increased resolution values in the spatial domain being used to recognize the currency item, and wherein the resolution (R) is reduced in the spectral domain, reduction of the resolution in the spectral domain comprising filtering a signal of the measurements in the spectral domain to reduce the resolution (R) in the spectral domain by taking a subset of the signal’s spectral components; and deriving a feature vector using the subset of spectral components, the feature vector being used to denominate the currency item, wherein the method is performed by the currency testing apparatus.

2. A method as claimed in claim 1 wherein the subset is of a predetermined size.

3. A method as claimed in claim 1 wherein the spectral domain is the frequency spectrum.

4. A method as claimed in claim 3 wherein the filtering excludes high frequency components.

5. A method as claimed in claim 1 wherein the signal of the measurements is normalized before said filtering.

6. A method as claimed in claim 1 comprising processing the feature vector using a neural network, including a back-propagation network or an LVQ network.

7. A method as claimed in claim 1 wherein measurements are derived at a first resolution R1 in a first spatial direction and at a second resolution R2 in a second spatial direction.

8. A method as claimed in claim 7 wherein the first and second directions are substantially perpendicular.

9. A method as claimed in claim 7 wherein R1<R2, and wherein the processing increases the resolution in the first direction to approximately R2.

10. A method as claimed in claim 1 involving a method of reconstituting a sampled signal.

11. A method as claimed in claim 1 involving summing measured values weighted by a weighting function.

12. A method as claimed in claim 11 wherein the weighting function is of the form sin(x)/x.

13. A method as claimed in claim 1 including using a weighting window to compensate for edge effects.

14. A method as claimed in claim 13 wherein the weighting window is a raised cosine window that comprises a Hamming or Hanning or Kaiser-Bessel window.

15. A method as claimed in claim 1 comprising removing a mean of the measurements before interpolation and reinstating it after interpolation.

16. A method as claimed in claim 1 wherein the measurements are derived along a line substantially parallel to one edge of the currency item.

17. A method as claimed in claim 1 wherein the currency item is a document, banknote or other value sheet.

18. A method as claimed in claim 1 wherein the currency item is a coin.

19. A currency tester comprising:

sensors to derive a plurality of measurements of a currency item in the currency tester at a resolution (R) defined relative to a spacing of the sensors;

a processor coupled to the sensors and arranged to process the plurality of measurements to derive values in at least two different resolutions, wherein the resolution (R) is increased in the spatial domain using an interpolation method, and wherein the resolution (R) is reduced in the spectral domain, reduction of the resolution in the spectral domain by the processor comprises filtering a signal of the measurements in the spectral domain to reduce the resolution in the spectral domain by taking a subset of the signal’s spectral components, wherein the processor is further arranged to derive a feature vector using the subset of spectral components, and wherein the processor is arranged to use increased resolution values in the spatial domain to recognize the currency item and to use the feature vector to denominate the currency item.

20. A currency tester as claimed in claim 19 comprising means for sensing a currency item at resolution R1 extending in a first direction and means for sensing a currency item at a resolution R2 in a second direction.

21. A currency tester as claimed in claim 19 comprising a linear sensor array of resolution R1 and means for moving the currency item relative to the sensor array at a resolution R2.

22. A currency tester as claimed in claim 19 arranged for testing a coin.

23. A currency tester as claimed in claim 19 arranged for testing a document, banknote or other value sheet.

24. A currency tester as claimed in claim 23 arranged such that a document can be fed in a transport path with skew and offset with respect to the edge of the transport path.

25. A currency tester as claimed in claim 19 arranged to process a plurality of currency items of different sizes.

26. A currency tester as in claim 19 wherein the subset is of a predetermined size.

27. A currency tester as in claim 19 wherein the spectral domain is the frequency spectrum.

28. A currency tester as in claim 19 wherein the processor is arranged to filter the signal of the measurements in the spectral domain by excluding high frequency components.

29. A currency tester as in claim 19 wherein the processor is arranged to normalize the signal of the measurements before filtering the signal of the measurements in the spectral domain.

30. A currency tester as in claim 19 wherein the processor is arranged to process the feature vector using a neural network, including a backpropagation network or an LVQ network.

* * * * *